United States Patent
Putz

(10) Patent No.: US 11,419,256 B2
(45) Date of Patent: Aug. 23, 2022

(54) COUPLING PLATE

(71) Applicant: SYN TRAC GmbH, Bad Goisern (AT)

(72) Inventor: Stefan Putz, Bad Goisern (AT)

(73) Assignee: SYN TRAC GmbH, Bad Goisern (AT)

( * ) Notice: Subject to any disclaimer, the term of this patent is extended or adjusted under 35 U.S.C. 154(b) by 0 days.

(21) Appl. No.: 16/870,256

(22) Filed: May 8, 2020

(65) Prior Publication Data

US 2020/0267888 A1 Aug. 27, 2020

Related U.S. Application Data

(63) Continuation of application No. PCT/EP2018/080818, filed on Nov. 9, 2018.

(30) Foreign Application Priority Data

Nov. 10, 2017 (DE) ............... 10 2017 126 477.9

(51) Int. Cl.
*H01R 13/64* (2006.01)
*A01B 76/00* (2006.01)
(Continued)

(52) U.S. Cl.
CPC .............. *A01B 76/00* (2013.01); *F16L 39/00* (2013.01); *H01R 13/005* (2013.01);
(Continued)

(58) Field of Classification Search
CPC .. H01R 13/005; H01R 13/512; H01R 13/631; H01R 43/26; H01R 2201/26; H01R 11/15; A01B 76/00; F16L 39/00
(Continued)

(56) References Cited

U.S. PATENT DOCUMENTS 3,125,361 A * 3/1964 Weaver ................ F16L 39/00
285/124.2
3,351,357 A 11/1967 Eaton
(Continued)

FOREIGN PATENT DOCUMENTS

AT 514147 A1 10/2014
AT 514147 B1 1/2016
(Continued)

OTHER PUBLICATIONS

International Search Report for International Application No. PCT/EP2018/080818 dated Jan. 30, 2019.

*Primary Examiner* — Abdullah A Riyami
*Assistant Examiner* — Vladimir Imas
(74) *Attorney, Agent, or Firm* — Stephen J. Kenny; Vincenzo DiMonaco; Foley Hoag LLP

(57) ABSTRACT

According to the present disclosure, a coupling plate is provided to form electrical, electronic, hydraulic and/or pneumatic connections. The coupling plate comprises an approximately flat base plate, at least two hydraulic connecting devices formed in the base plate, at least one electronic connecting device to provide an electronic connection between a control device of a vehicle and a control device of an accessory device, at least one electrical connecting device, a centring device with at least two coupling and/or counter coupling elements for the relative alignment of the connecting devices of the coupling plate and, if necessary, corresponding connections.

17 Claims, 6 Drawing Sheets

(51) Int. Cl.
*F16L 39/00* (2006.01)
*H01R 13/00* (2006.01)
*H01R 13/512* (2006.01)
*H01R 13/631* (2006.01)
*H01R 43/26* (2006.01)

(52) U.S. Cl.
CPC ......... *H01R 13/512* (2013.01); *H01R 13/631* (2013.01); *H01R 43/26* (2013.01); *H01R 2201/26* (2013.01)

(58) Field of Classification Search
USPC ........................................................ 439/378
See application file for complete search history.

(56) References Cited

U.S. PATENT DOCUMENTS

| | | | | |
|---|---|---|---|---|
| 4,567,894 A * | 2/1986 | Bergman | ............... | A61B 5/055 600/415 |
| 4,752,236 A * | 6/1988 | Carmichael | ........ | H01R 13/6395 439/372 |
| 4,998,781 A * | 3/1991 | Kehl | ................ | B60T 8/368 303/10 |
| 5,391,091 A * | 2/1995 | Nations | ............... | H01R 13/631 439/359 |
| 5,443,389 A * | 8/1995 | Hughes | ................ | B60D 1/62 439/35 |
| 5,533,905 A * | 7/1996 | Hio | .................... | B60R 16/0239 361/752 |
| 5,695,259 A * | 12/1997 | Isshiki | ............... | B60R 16/0239 303/119.2 |
| 5,828,223 A * | 10/1998 | Rabkin | .............. | G01R 31/2887 324/750.19 |
| 5,947,766 A * | 9/1999 | Tsuji | .................... | H01R 13/748 439/559 |
| 6,257,918 B1 * | 7/2001 | Yamamoto | ......... | H01R 13/6315 439/34 |
| 6,997,741 B2 * | 2/2006 | Doll | ........................ | G06F 1/183 439/357 |
| 7,059,899 B2 * | 6/2006 | Doll | ........................ | G06F 1/183 439/357 |
| 7,079,397 B2 * | 7/2006 | Huang | ................... | G06F 1/1613 206/219 |
| 7,481,664 B1 * | 1/2009 | Knoll | .................. | H01R 13/6275 439/359 |
| 7,614,910 B2 * | 11/2009 | Croteau | ................ | H01R 13/512 439/559 |
| 7,713,076 B2 * | 5/2010 | Arts | ...................... | H01R 13/748 439/248 |
| 7,950,942 B2 * | 5/2011 | Klinger | .............. | H01R 13/6315 439/247 |
| 8,177,559 B2 * | 5/2012 | Alguera | .............. | H01R 13/639 439/35 |
| 8,596,665 B2 * | 12/2013 | Scharmuller | ............ | B60D 1/06 280/507 |
| 9,270,052 B1 * | 2/2016 | Martin | ................ | H01R 13/6315 |
| 9,764,778 B2 * | 9/2017 | Scharmuller | ........ | A01B 71/063 |
| 10,401,710 B2 * | 9/2019 | Wilson | ................... | F16M 13/02 |
| 2006/0258206 A1 * | 11/2006 | Lam | ........................ | G06F 1/181 439/521 |
| 2008/0014774 A1 * | 1/2008 | Hagen | ...................... | F16L 5/12 439/157 |
| 2011/0008992 A1 | 1/2011 | Gallego et al. | | |
| 2011/0183529 A1 * | 7/2011 | Heise | ..................... | H01R 13/33 439/1 |
| 2011/0291383 A1 | 12/2011 | Goulet et al. | | |
| 2016/0052563 A1 | 2/2016 | Scharmuller et al. | | |
| 2016/0113188 A1 | 4/2016 | Huegerich et al. | | |
| 2016/0115999 A1 | 4/2016 | Huegerich | | |
| 2020/0119473 A1 * | 4/2020 | Yoshida | ................ | H05K 3/325 |
| 2020/0178413 A1 * | 6/2020 | Thibaut | ............. | H05K 7/20272 |
| 2020/0267888 A1 | 8/2020 | Putz | | |

FOREIGN PATENT DOCUMENTS

| | | |
|---|---|---|
| CH | 592541 A5 | 10/1977 |
| DE | 2900866 A1 | 7/1980 |
| DE | 102009056071 A1 | 6/2011 |
| DE | 202011106833 U1 | 2/2012 |
| EP | 0676123 A1 | 10/1995 |
| JP | H08-289606 A | 11/1996 |
| JP | 2008-153087 A | 7/2008 |
| JP | 2011-223898 A | 11/2011 |
| WO | WO-2009/112553 A2 | 9/2009 |

* cited by examiner

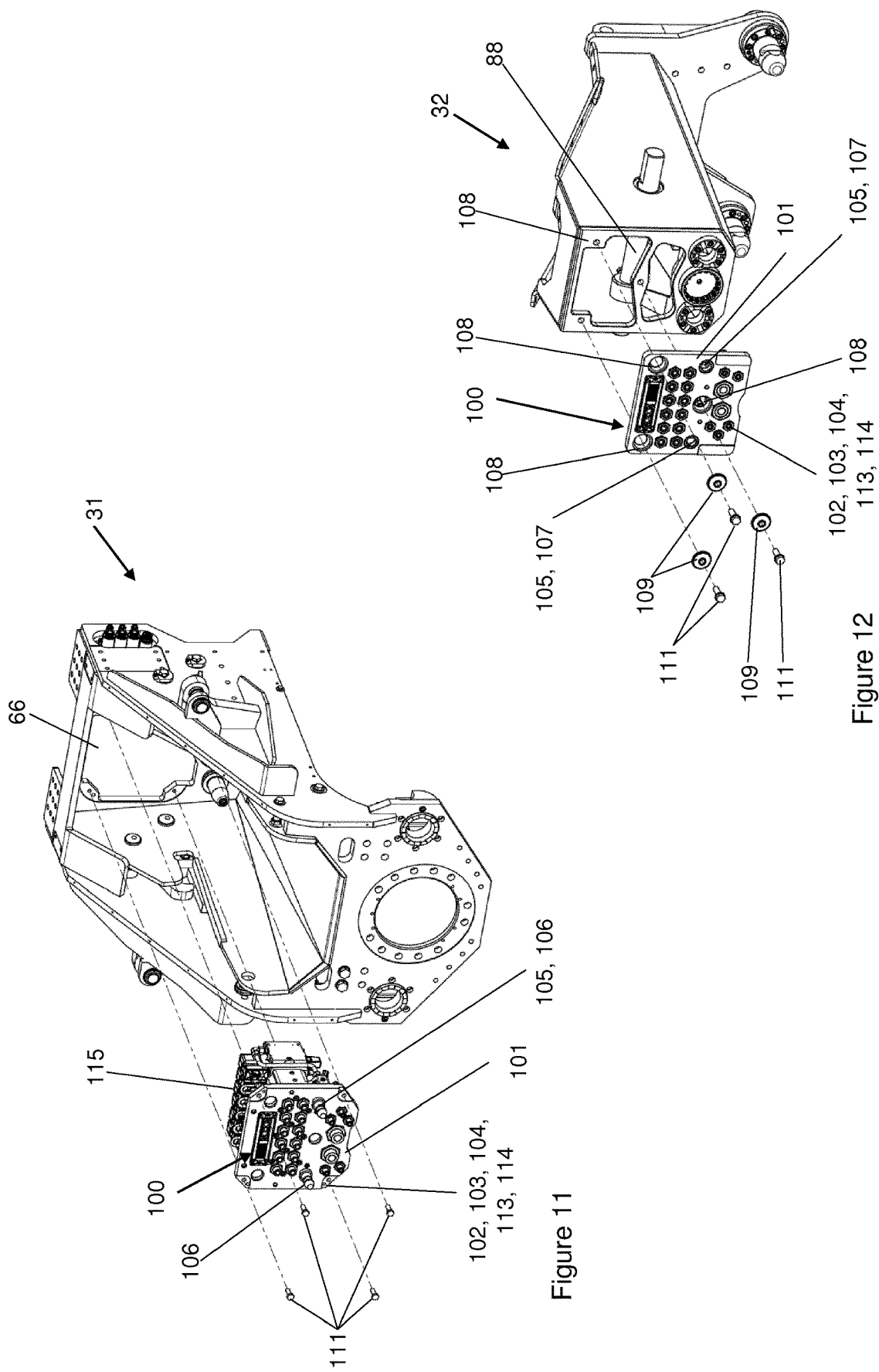

COUPLING PLATE

CROSS-REFERENCE TO RELATED APPLICATIONS

This application is a Continuation of and claims the benefit of priority under 35 USC 120 to PCT/EP2018/080818 filed Nov. 9, 2018, which claims priority to DE 10 2017 126 477.9 filed Nov. 10, 2017, the entire contents of each are hereby incorporated by reference.

The present disclosure concerns a coupling plate.

A coupling part is disclosed in AT 514 147 B1 with a coupling device with contacts arranged to be movable, particularly movable linearly. The coupling device is designed to link to, in particular automatically, the contacts with the counter coupling part, the latter being held in a fixed position. By doing so, a reliable and, in particular, automatic joining of the connections can be made with the counter coupling part since the counter coupling part is held, located fixed in a predetermined position, known as the fixing position. The joining can take place by moving the connections by means of the coupling device in the direction of the counter coupling part. The coupling device has a movably located docking plate wherein the connections are arranged on the docking plate and the docking plate can be slid by means of a slide unit from a first position to a second position, wherein, in the second position, the connections of the docking plate are able to link to a counter coupling part arranged in the fixing position. By doing so, in the coupling step, the sliding unit of the docking plate can be slid with the connections towards the mating contacts, and, in doing so, the connections are made to the mating connections. A plurality of different connections can be made thereby with the corresponding mating connections in a simple and reliable manner. In particular, provision can be made wherein the connections of the coupling device include an electrical connection, a hydraulic connection and/or a compressed air connection.

A quick coupling system for accessory equipment, in particular, for agricultural accessory equipment, is known from DE 20 2011 106 833 U1. This quick coupling system essentially corresponds to an agricultural three-point attachment for conventional accessory devices with two lower guides and one upper guide. In order to couple together hydraulic connections, in particular high pressure hydraulic connections, as well as electrical interfaces also, the quick coupling system has a coupling plate which is arranged to be movable on the frame of the quick coupling system and is movable in particular by actuators such as hydraulic cylinders in an axial direction perpendicular to the surface sides. Thus, by using this device in a commonly known manner, a mechanical connection can be produced between an accessory device and a tractor and, followed by separate movement sequences, a hydraulic or electrical coupling can be made. However, in doing so, it is still additionally necessary, after the mechanical connection of coupling part and counter coupling part, to separately connect together the coupling devices or docking plates.

SUMMARY OF THE DISCLOSED SUBJECT MATTER

It is amongst the objectives of the present disclosure to address one or more of the problems outlined above. The task of the present disclosure is to produce a device for making electrical, electronic, hydraulic and/or pneumatic connections which enable these connections to be made in a safe, reliable and precise manner between a vehicle and a piece of accessory equipment in a simplified and quick manner.

This task is resolved with of a coupling plate with the features of claim 1. Advantageous embodiments are described in the dependant claims. A further task is to create a method to operate the device which enables a safe, reliable and quick connection to be made. The task is resolved with the features of claim 9.

According to the disclosure, a coupling plate is provided to form electrical, electronic, hydraulic and/or pneumatic connections. The coupling plate comprises an approximately flat base plate, at least two hydraulic coupling devices formed in the base plate, at least one electronic connection device to make an electronic connection between a control device of a vehicle and a control device of an accessory device, at least one electrical connection device, a centring device with at least two coupling and/or counter coupling elements for the relative alignment of the coupling arrangements on the coupling plate with respect to corresponding connections. According to the disclosure, the coupling plate is defined axially in relation to the coupling movement so that the mechanical coupling of an accessory device and an agricultural machine also automatically connects the electrical, electronic, hydraulic and/or pneumatic connections together.

By providing at least coupling and/or counter coupling elements for the relative alignment of the connecting devices of the coupling plate with respect to corresponding couplings, preferably to a further coupling plate, the connections being connected together, or respectively, the connecting devices, can be aligned with each other precisely in a preferably vertical coupling plane. The coupling- and/or counter coupling elements can be designed as centring pins and/or centring pin recesses.

Furthermore, at least three positioning devices can be provided which serve to provide a slight amount of clearance in the coupling plate in relation to the docking receptacle holding it, or the docking slot holding it in a docking or coupling operation of two coupling plates in a vertical and/or horizontal plane.

That enables the coupling plate to finely centre itself by means of the plastic bushings, or rubber bushing bearing and the holes provided for it with centring pins on the vehicle so that precise alignment can be achieved in the region of 0.05 mm required for the hydraulic coupling device, which is also important because the coupling plates are fixed axially and are connected together with the docking receptacles and slots.

The positioning devices can be formed as elastic plastic bushings wherein the plastic bushings have recesses to accommodate connecting means to attach the coupling plate to a coupling device.

This base plate can be provided with a plurality of electrical, electronic, hydraulic and/or pneumatic as well as mechanical connecting elements. The coupling plate comprises at least two hydraulic connection devices. These two hydraulic connection devices are provided for the actuation of supporting foot cylinders available on almost all connectable attachment devices.

Furthermore, it is imperative that an electronic connection device to a control device is always available on the module, or on an accessory device. This electronic connection serves to identify the type of module, or the type of trailer, or the type of accessory device.

Preferably, at least one electrical connection device is always also provided to actuate a light on the add-on module. The coupling plate is connected with a dock receptacle or a docking slot and is connected, fixed in position, with it with respect to the direction of travel, or respectively, to the axial connection direction of the docking device. This has the considerable advantage that an additional separate connection of the coupling plate is dispensed with after the coupling of the docking device and the mechanical connection of vehicle and accessory device simultaneously produces the electrical, electronic, hydraulic and pneumatic connections.

Furthermore, preferably two electrical control contacts are always connected together electrically by coupling the docking slot to indicate whether a docking slot is fully inserted into a docking receptacle and locking can be activated. The electrical contacts can be designed separately or form a component of an electrical connection device.

A feature or features of any aspect of the disclosure described herein may be combined in some embodiments with any feature or features of any other aspect of the disclosure described herein.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIG. 11: a perspective exploded drawing of a coupling plate and a docking receptacle according to the disclosure,
and
FIG. 12: a perspective exploded drawing of a further coupling plate and a docking slot according to the disclosure.

DETAILED DESCRIPTION OF AN EXEMPLARY EMBODIMENT

Figure 2:
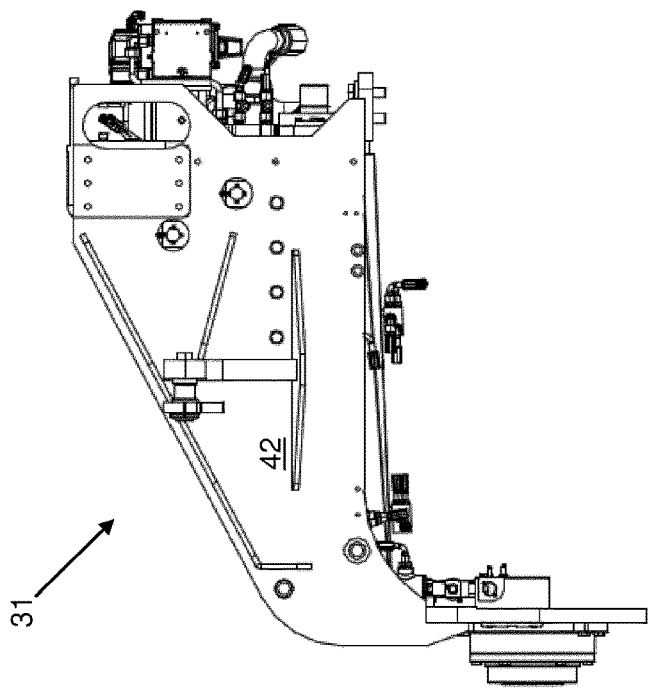
FIG. 2: a lateral plan view of the docking receptacle.
Figure 1:
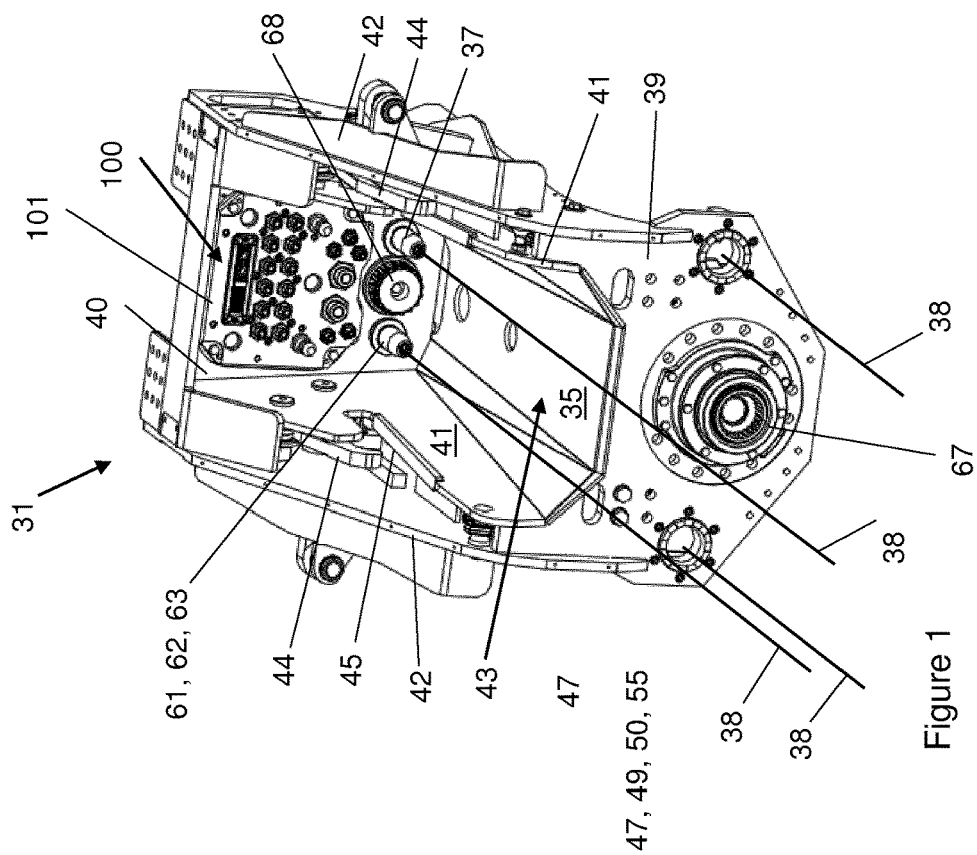
FIG. 1: a perspective view of a docking receptacle.
Figure 4:
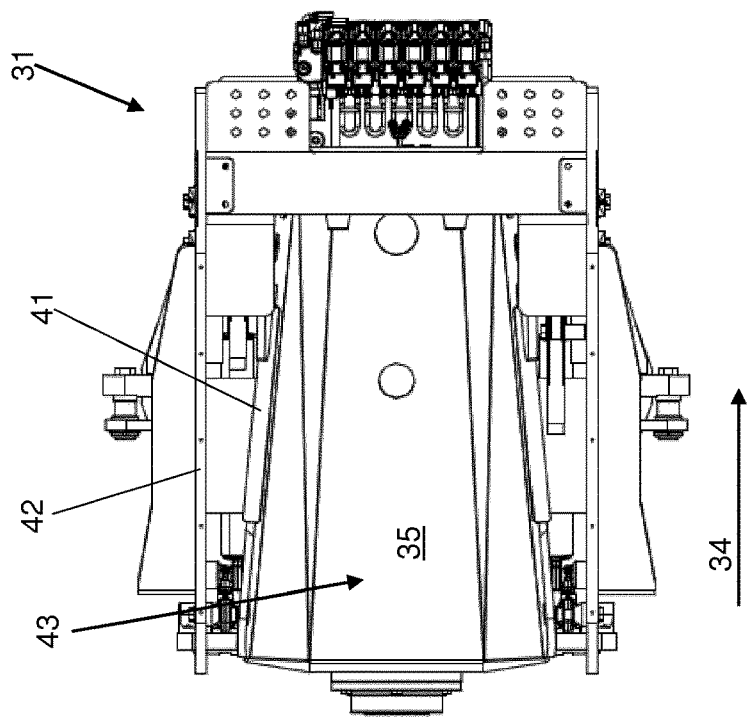
FIG. 4: a plan view from above on to the docking receptacle.
Figure 3:
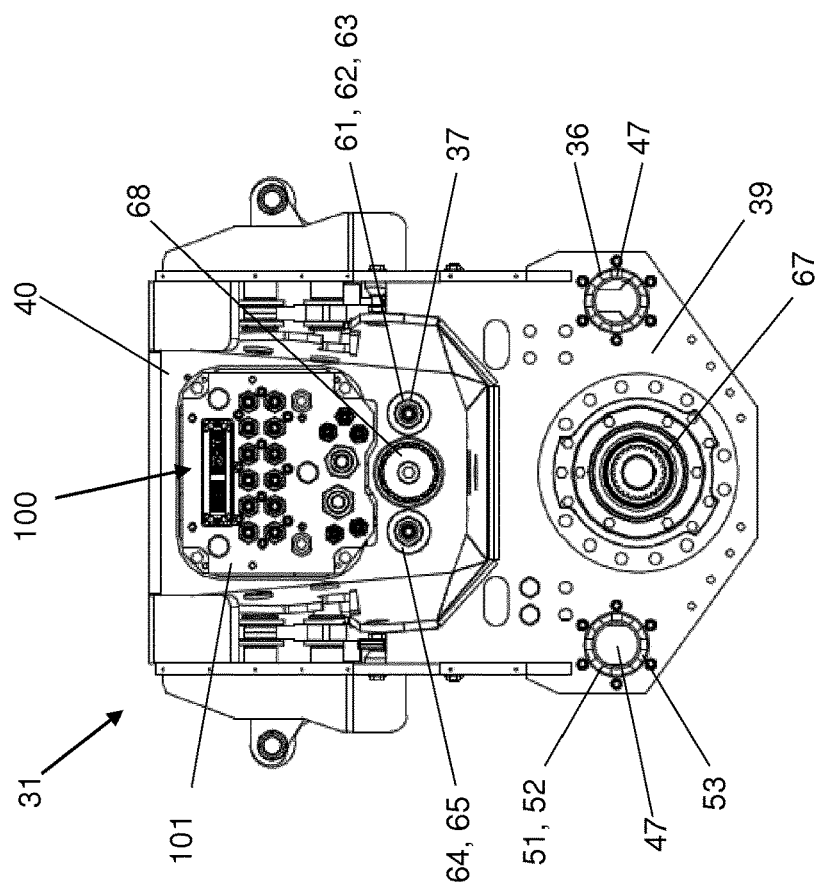
FIG. 3: a plan view of the front of the docking receptacle.
Figure 6:
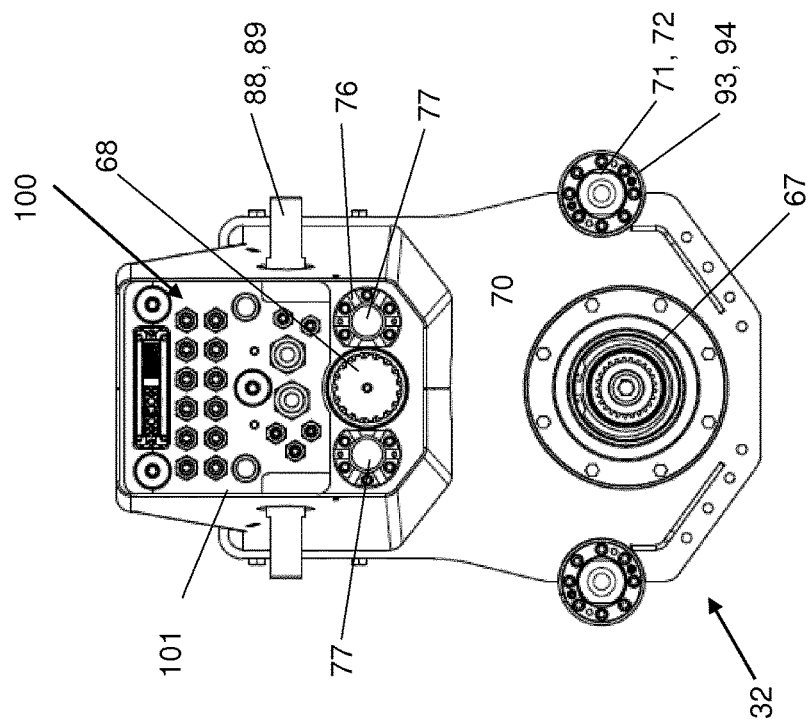
FIG. 6: a plan view from the front of the docking slot.
Figure 5:
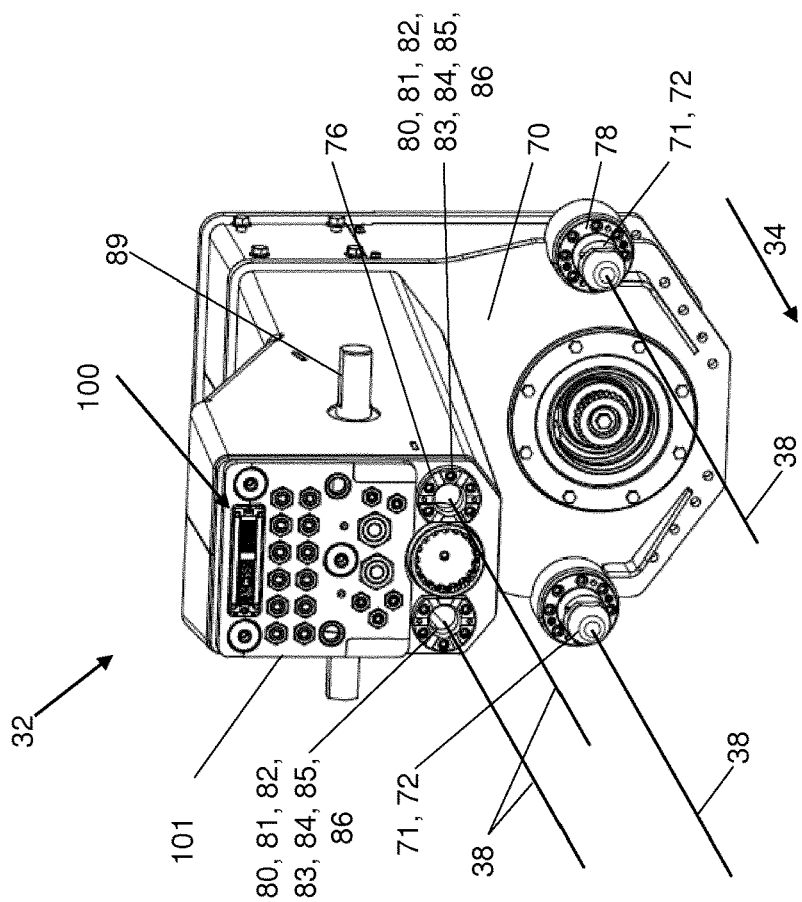
FIG. 5: a perspective view of a docking slot.
Figure 8:
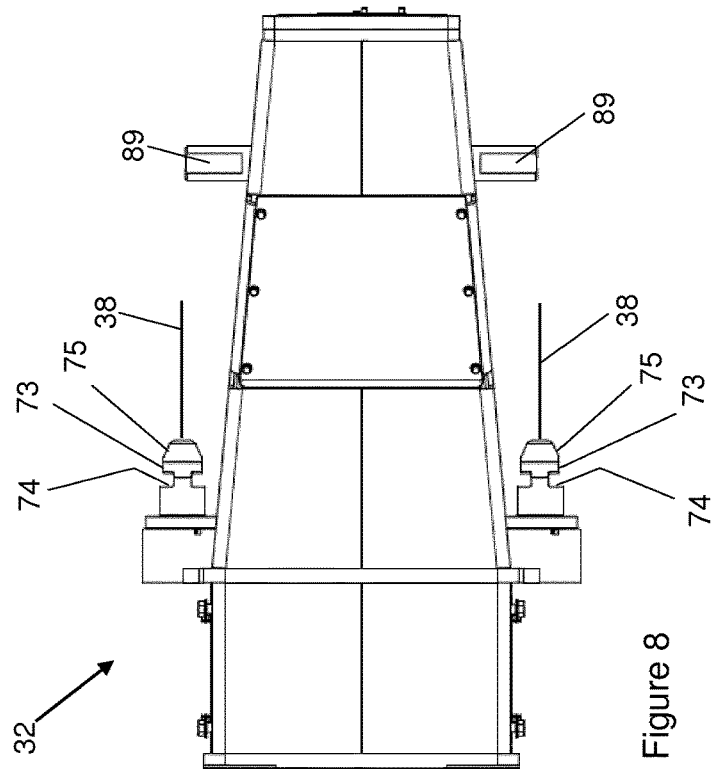
FIG. 8: a plan view from above on to the docking slot.
Figure 7:
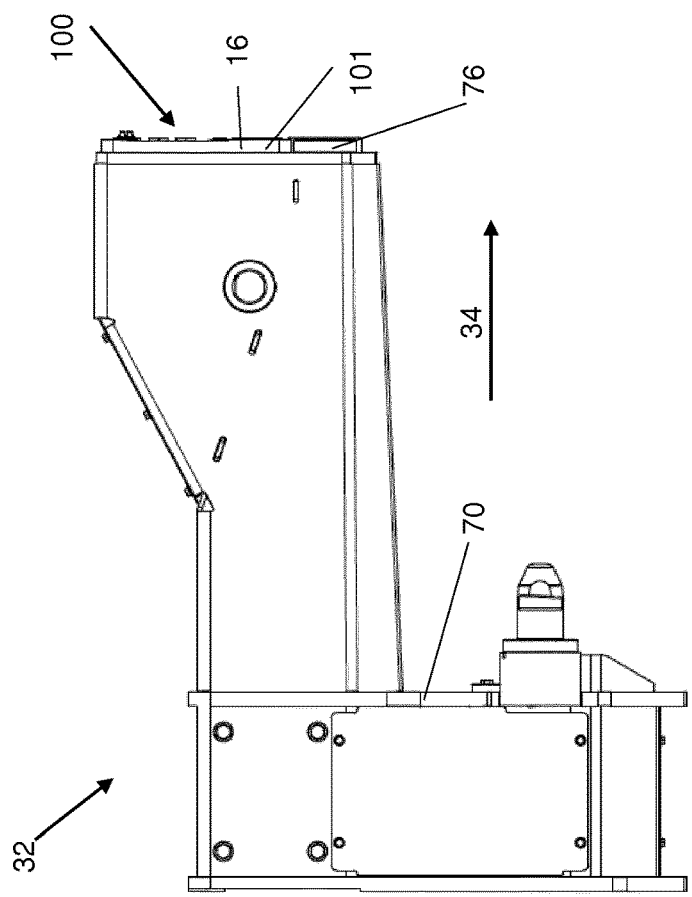
FIG. 7: a lateral plan view of the docking slot.
Figure 10:
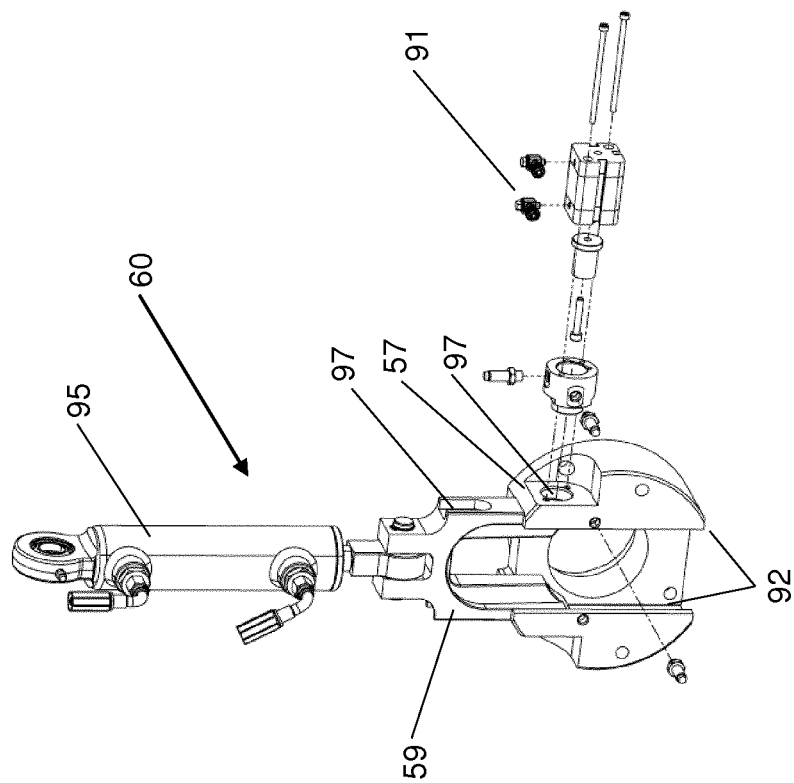
FIG. 10: a further partial perspective exploded view of the wedge fork with hydraulic cylinder and the locking device.
Figure 9:
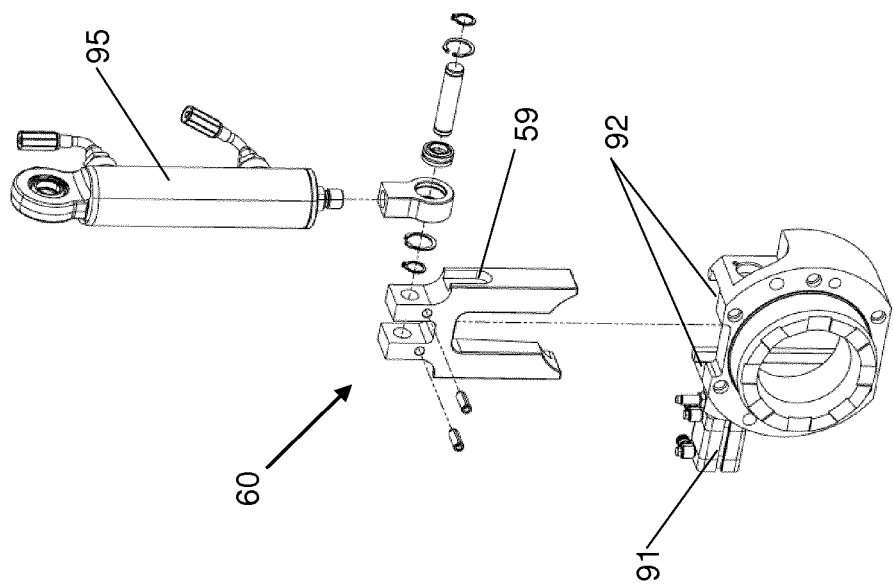
FIG. 9: a partial perspective exploded view of a wedge fork with hydraulic cylinder and a locking device.

According to the present disclosure, a coupling plate 100 is provided to form electrical, electronic, hydraulic and/or pneumatic connections, as shown in FIGS. 1 to 8 and 11 to 12.

This coupling plate 100 comprises an approximately flat base plate 101. This base plate 101 can be provided with a plurality of electrical, electronic, hydraulic and/or pneumatic as well as mechanical connecting elements. At least two hydraulic coupling devices 113 are formed on the base plate 101. These two hydraulic coupling devices 113 are provided to operate almost all supporting foot cylinders present on almost all connectable modules.

Furthermore, at least one electronic connection device 102 is provided on the base plate 101 to provide an electronic connection between a control device of a vehicle and a control device of an accessory device. This electronic connection serves to identify the type of module, or type of trailer or type of accessory device.

Furthermore, at least one electrical connection device 103 is arranged on the base plate 101. This electrical connection device is provided to operate a light (e.g. braking, front, rear, positional or warning light) on the attached module. Also, there are two electrical control contacts 104, which are connected together electrically by coupling the docking slot 32 with the docking receptacle 31, to detect whether the docking slot 32 is inserted completely into the docking receptacle 31 and a securing and/or locking device can be activated.

Alongside the minimum connecting devices described above, the coupling plate has a centring device 105. This centring device 105 comprises, if the coupling plate 100 is provided for the docking receptacle 31, at least two centring pins 106, wherein the corresponding centring recesses 107 are designed to correspond to a coupling plate of the docking slot 32.

The centring device comprises at least two coupling and/or counter coupling elements, wherein the coupling elements are, for example, the centring pins 106 and the counter coupling elements are the centring recesses 107. Furthermore, three connecting holes 108 are provided in a coupling plate 100 to connect the coupling plate 100 with a docking slot 32 or a docking receptacle 31.

Tubular plastic bushings 109 or rubber bearings are provided in these connecting holes 108, and are produced from an elastic material to provide a small amount of clearance in the transverse direction and, by doing so, to increase the precision when connecting two coupling plates. In the axial direction, they can display an absorption and/or prestressing function. In this case, by absorption and/or prestressing function it is understood that the coupling plates are established on the coupling elements, together with the coupling elements, and with the mechanical connection and locking of the coupling elements, the correspondingly desired connection are also produced. For this, both the electrical as well as the electronic and fluidic connection plates of two coupling plates are intertwined. By so doing, the plastic or rubber bushings are able to exert an absorption effect if necessary when the coupling plates approach each other with an axial movement or a slightly prestressing action. This prestressing action is guaranteed in that a counterforce develops against an axial elastic shifting of the bushings, so that the contacts of the coupling plates rest within each other with some compressive stress, if it should be necessary.

Fixing means 111, such as screws, can be arranged in corresponding recesses 110 of the plastic bushings 109 in order to attach the coupling plate 100 to a coupling device, such as a docking slot 32 or a docking receptacle. The plastic bushings 109 form a positioning device 112 when combined with the fixing means 111. Pneumatic connection devices 114 are also provided in the base plate 101. Features of the coupling plate are described below in more detail.

A coupling plate 100 fitted to a vehicle comprises the approximately flat base plate 101, on which are incorporated, on the attachment, electrical connection devices 103 and/or electronic connection devices 102, such as electric plugs 102, hydraulic connection equipment 113, such as hydraulic connection devices 113, and pneumatic connection devices 114, such as compressed air couplings, as well as centring pins 106 for finely centring the coupling plate on the attachment. A valve block 115 with up to six double-acting hydraulic control devices (not shown) is flange-mounted on the vehicle and, therefore, is connected preferably solidly to the base plate 101. Due to the flange-fitting of the valve plate 115 directly to the base plate 101, advantageously additional lines between valve block 115 and the hydraulic couplings 113 are avoided.

The coupling plate 100 is hydraulically designed such that only the pressure tank and load information lines are connected for the working hydraulics. The line between these main connections and the couplings of a power-beyond system as well as the supply of the valve block 115 are incorporated in the base plate 101. The base plate 101 is screwed solidly by attachment means 111 to a docking receptacle 31 on the vehicle. The coupling plate 100 on the docking slot on the attached device comprises the corresponding opposing plug and couplings and is connected solidly by means of the positioning device 112 or the plastic bushings 109 and the attachment means 111 to a docking slot 32.

The positioning device 112 is designed, therefore, to provide a slight clearance for the coupling plate in a vertical or a horizontal plane (transverse direction) in relation to a coupling device. This enables the coupling plate 100 to centre itself finely by means of the plastic bushings 109 or rubber bushings and the holes provided for the purpose in relation to the centring pins 106 on the vehicle in order to achieve a precise alignment in the region of 0.05 mm required for the hydraulic coupling.

In the joining of two coupling plates according to the disclosure, designed to connect a vehicle with an accessory device, the following connections are made during the simultaneous coupling:
- electrical connections (lighting, electrical power supply)
- electronic connections (CAN-BUS, possibly ISO-BUS, Ethernet)
- hydraulic connections for vehicle hydraulics and working hydraulics
  - up to six double-acting hydraulic control devices with a maximum throughflow in each case of 100 litres per minute
  - power-beyond-coupling with a maximum throughflow of 180 litres per minute
- hydraulic couplings for supporting feet on the accessory device
- compressed air supply
- compressed air brakes for additional attachable axis modules and/or trailers or attachment devices.

The attachment of two coupling plates 100 according to the disclosure is done by connecting a docking slot 32 to a docking receptacle 31.

In the attachment of two coupling plates 100 according to the present disclosure, provision is made accordingly that the centring pins 106 of a coupling plate 100 connected with a docking receptacle 31 penetrate into the corresponding centring recesses 105 of a coupling plate connected according to the present disclosure with a docking slot 32 and, in this manner, both coupling plates 100 in particular align exactly with each other in a vertical connecting plane.

In this manner, all electrical, electronic, hydraulic and/or pneumatic connections provided on the docking slot 32 and docking receptacle 31 are connected to each other. Below, a docking receptacle 31 (coupling device) of a docking device 30 (coupling device) to accommodate a docking slot 32 (coupling device) is described by means of an embodiment example. The docking receptacle 31 comprises an approximately U-shaped pre-centring device 33 with an approximately conically tapering insertion lead-in 35 in an insertion direction 34 for pre-centring a docking slot 32 designed to correspond with the docking receptacle. Furthermore, at least a first and a second centring device 36, 37 are provided on the docking receptacle 31, wherein the first and second centring device 36, 37 each comprise two coupling elements and/or counter coupling elements to connect with corresponding coupling elements and/or counter coupling elements of a docking slot 32.

Furthermore, the first and the second centring device 36, 37 are designed to centre the docking slot 32 in the insertion direction 34 in relation to the docking receptacle 31 along four centring axes 38 corresponding to the four coupling or counter coupling elements. Also, the docking receptacle 31 comprises a retraction device with two hydraulically operated arrestor hooks 44 to draw the docking slot 32 into the docking receptacle 31 in the insertion direction 34.

The docking receptacle 31 comprises two docking walls 39, 40 extending in a vertical direction and offset from one another in a horizontal direction. These two docking walls 39, 40 are connected together by means of an insertion lead-in 35 extending in an approximately horizontal direction. Accordingly, a first docking wall 39 is arranged in a vertical direction in the region below the insertion lead-in 35 and a second docking wall is arranged to limit the insertion lead-in 35 in the horizontal direction above the insertion lead-in 35.

The insertion lead-in undertakes the pre-centring task during the insertion of a docking slot into the docking receptacle by receiving a body of the docking slot 32 designed to correspond to the insertion lead-in 35. In order to pre-centre the docking slot 32 when inserting into the docking receptacle 31, the geometry of the insertion lead-in 35 tapers in the insertion direction 34 to enable pre-centring of the docking slot. On both sides of the insertion lead-in 35, inner and outer side walls 41, 42 extending in a vertical direction are provided approximately transverse to the insertion direction 34. These inner and outer side walls 41, 42 are arranged at a predetermined angle in the insertion direction 34 such that a receptacle space 43, delimited by the inner side walls 41 and the insertion lead-in 35, tapers in the insertion direction.

In the inner side walls 41, catch pin guides 45 are formed for the guidance and receipt of corresponding catch pins provided on a docking slot 32. In the inner and outer side walls 41, 42, shafts are arranged in corresponding holes on which the arrestor hooks 44 are pivoted. Thus, the arrestor hooks are arranged in an arrestor hook space delimited by the inner and outer side walls. The arrestor hooks can be operated by corresponding arrestor hook cylinders 46. In the region of the first docking wall 39, bushing-shaped centring pin receptacles 47 (counter coupling elements) are provided which form the first centring device 36 of the docking receptacle 31. Then, the first docking wall 39 is provided in the insertion direction 34, which has two holes 48 to accommodate the bushing-shaped centring pin receptacles 47. The bushing-shaped centring pin receptacles 47 are arranged in the holes 48. The bushing-shaped centring pin receptacles 47 are arranged therefore, in the insertion direction 34 behind the first docking wall 39. The bushing-shaped centring pin receptacles 47 comprise, in the insertion direction 34, a tubular insertion/centring section 49 and a safety section 54.

The tubular insertion/centring section 49 has a cone-shaped tapering insertion recess 50, wherein a vertical front face arranged against the insertion direction 34 protrudes from the first docking wall 39 and a first axial stop face 51 forms a first stop device 52. Radially surrounding and equally spaced apart from each other, dirt removal grooves 53 are formed in this circular first stop face 51 to accept and remove contaminants. These types of contaminants would alter the position of the stop. This is disadvantageous to the extent that it would be impossible to have a precise coupling between docking receptacle and docking device. The tubular insertion/centring section 49 has a cylindrical centring recess 55 connecting to the insertion recess in the insertion direction 34.

On a circular front face opposite the insertion direction 34, the tubular safety section 57 has holes 56 to connect to the first docking wall 39, for example, by means of corresponding screw fastenings. This front face has a greater diameter than the tubular insertion/centring section 49 and, because of this, forms a radially surrounding stop shoulder which prevents the bushing-shaped centring pin receptacle from shifting against the insertion direction 34. The advantage of this arrangement is that the longitudinal forces which are introduced on the one hand by accessory equipment and on the other hand by the wedge forces of the wedge forks are superimposed, do not have to be introduced by a screw connection into the docking receptacle.

Furthermore, grooves 58 extending in a vertical direction are present in the tubular safety section 57 to receive hydraulically operable wedge forks 59. The wedge forks 59 are provided for fixing a corresponding centring pin of a docking slot 32 and can slide in a vertical direction from a free position to a fixed position. The wedge forks 59 thus form an axial securing device 60.

In the region between the two bushing-shaped centring pin receptacles 47, a drive shaft connecting device is provided approximately centrally in the first docking wall 39. A drive shaft connecting device 67 is a part of a drive shaft connecting device to connect one end of a drive shaft on a vehicle with one end of a drive shaft on accessory equipment.

A recess 66 is formed in the second docking wall 40 to accommodate a coupling plate to provide electrical, electronic, hydraulic and/or pneumatic connections between a vehicle and an accessory device. The coupling plate with a flange-mounted valve block can be formed by very simply and quickly loosening just four screws for repair purposes opposite the insertion direction 34. Furthermore, two centring pins 61 extending against the insertion direction 34 (coupling elements) are provided in the region of the second docking wall 40 wherein said pins form the second centring device 37 of the docking receptacle 31.

In the insertion direction 34, the centring pins 61 have a wedge-shaped insertion section 62 and a cylindrical centring section 63 connected to it. A circular vertical front face lying to the front in the insertion direction 34 and connected to the centring section 63 forms a second stop face 64 of a second stop device 65.

The coupling elements and/or the counter coupling elements of the first and the second centring device thus form at least two axial stop devices which delimit a relative movement between docking receptacle and docking slot in the insertion direction. The stops are formed preferably on the first and/or second centring pins and/or on the first and/or second centring recesses extending in a plane perpendicular to the insertion direction of circular stop faces.

A PTO (Power Take Off) shaft connecting device 68 is provided in the region between both centring pins 66 approximately centrally in the second docking wall 40. A PTO shaft connecting device 68 is a part of a PTO shaft connecting device to connect one end of a PTO shaft on a vehicle with one end of a PTO shaft on accessory equipment.

The docking receptacle is positioned over a large (diameter approx. 258 mm), mechanically machined hole in the first plate at a centring attachment on a central pipe flange of a central axis piece. This precision makes it possible that, for the connection of the PTO drive of the gearbox and the PTO shaft connecting device, a connecting shaft with geared sockets can be used. With this system, it is unnecessary to have an expensive connection and certainly not a connection using a cardan joint which is not maintenance-free.

The docking slot 32 will be described below, using an example. The docking slot 32 is designed corresponding to the docking receptacle 31. The docking slot 32 firstly has a first docking wall 70 in the insertion direction 34. The first docking wall 70 extends substantially in a vertical direction and, on its underside, has a correspondingly designed lower wall 89 on the docking receptacle 31 for the insertion lead-in 35. Furthermore, a drive shaft connecting device is provided on the first docking wall 70 approximately in the centre.

Corresponding to the centring pin receptacle 47 of the first centring device 36 of the docking receptacle 31, first centring pins 71 of a first centring device 72 of the docking slot 32 are formed on the first docking wall 70 of the docking slot 31 extending in the insertion direction 34. In the insertion direction 34, the first centring pins 71 have a cylindrical centring section 73 and a conical insertion section 74 adjoining it. Furthermore, the first centring pins 71 have circular first stop faces 93 which form a first stop device 94 of the first centring device 72 against the insertion direction.

In the cylindrical centring section 73, wedge fork receptacle grooves 74 are provided, extending in the vertical direction and formed in a convex shape and corresponding to the wedge forks 59. An insertion body 75 is provided on the first docking wall, extending in the insertion direction for the arrangement in the receptacle space 43 of the docking receptacle 31. In the insertion direction at the front, the insertion body 75 has a second docking wall 76 extending in an approximate vertical direction. In the second docking wall, corresponding to the second centring pins 61 of the second centring device 37 of the docking receptacle 31, corresponding centring pin receptacles 77 of a second centring device 78 of the docking slot 32 are formed. The second docking wall 76 has two holes 80 to accommodate the bushing-shaped centring pin receptacles 77.

The bushing-shaped centring pin receptacles 77 are arranged in the holes 80. In the insertion direction 34, the bushing-shaped centring pin receptacles 77 comprise a centring section 82 and an insertion section 81. The tubular insertion section 81 has a tapering insertion recess 83 in a wedge shape, wherein a front face arranged against the insertion direction 34 protrudes from the second docking wall 76 and forms a second axial stop face 84 of a second stop device 85. In this circular second stop face 85, radially surrounding and uniformly spaced dirt removal grooves 86 are formed to receive and remove contaminants. The tubular centring section 82 has a cylindrical centring recess 87 connecting to the insertion recess 83 against the insertion direction 34.

A PTO connecting device is arranged in the region between these centring pin recesses 77. A coupling plate receptacle is formed in the region in a vertical direction above the second centring device 78. Furthermore, a PTO shaft 88 extending transversely to the insertion direction 34 is arranged on the insertion body 75. The ends of the shaft form capturing pins 89. These capturing pins 89 are grasped by the arrestor hooks 44 of the docking receptacle 31 with the insertion of the docking slot 32 into the docking receptacle 31 and then, by means of the hydraulically operated arrestor hooks 44 of the docking slot 32 are pulled into the docking receptacle 32, wherein a lower wall 90 of the insertion body 75 of the docking slot 32 slides correspondingly in the insertion lead-in 35 of the docking receptacle 31.

Besides an axial locking as a safety device 60, the hydraulic wedge forks still have a second locking device extending transversely to the insertion direction. The second locking device comprises a pneumatically operable safety body which fixes the wedge forks in the centring pin bushing. This second locking can happen only if the hydraulic wedge fork is correctly positioned. Accordingly, a sensor is provided in order to check the position of the hydraulic wedge fork. The advantage of wedge forks is that they are easy to automate. At this time, the wedge forks run in the wedge fork grooves.

According to an alternative embodiment, provision can be made that the centring devices or their centring elements (pins, bushings) are interchanged. In this case, it is simply of vital importance that both centring pins or centring recesses of the first and the second centring devices are designed such that all four components enable centring to be simultaneous since an accessory device arranged on the docking slot is often very heavy and, as a result, it is necessary that the centring in the axial insertion direction is exact.

A description is given below of a method of docking, or an insertion of the docking slot in the docking receptacle or a method of connecting a docking slot with a docking receptacle.

First, the insertion body 75 of the docking slot is arranged in the region of the receptacle space 43 of the docking receptacle 31, preferably by operating the vehicle and therefore the docking receptacle 31 arranged on it. By doing so, the docking slot is pre-centred in the docking receptacle due to the sliding of the lower or insertion wall 90 of the docking slot 32 in the insertion lead-in 35 of the docking receptacle 31.

After a relative movement in the insertion direction for a predetermined distance has happened, the arrestor hooks 44 of the docking receptacle are actuated by means of the arrestor hook cylinder 46, after which it is lowered down in a vertical direction so that capturing recesses 69 of the arrestor hooks 44 engage with the capturing pins 89 of the docking slot.

Next, the movement of the docking slot in the docking receptacle takes place by the movement of the vehicle. By so doing, pre-centring takes place. Then, the arrestor hooks snap in and pull the docking slot in the insertion direction into the docking receptacle. Two rollers which can swivel in the docking receptacle form a slotted guide system with a slot in the arrestor hooks and a track on the upper side of the arrestor hook. This slotted guide system works in such a way that the arrestor hooks firstly move, when moving out, in the longitudinal direction of the vehicle and then move upwards. This produces an opening in which the capturing pins are inserted when entering into the docking slot. As the arrestor hooks are pulling, the hooks move downwards initially and interlock with the capturing pins. Then, the docking slot is drawn in.

Next, the capturing pins slide along a catch pin guide 45 in the inner side walls 41 of the docking receptacle 31, wherein the capturing pins 89 are arranged in the catch pin guide 45 with just a small amount of clearance.

Subsequently, by moving the docking slot 31 in the insertion direction 34, further centring of the docking slot 32 takes place in the docking receptacle 31 by means of the first and second centring devices 36, 37, 72, 78 of the docking receptacle 31 and of the docking slot 32 along the four centring axes 38.

In this process, the two centring pins 71 of the first centring device 72 of the docking slot 32 with their insertion sections 74 slide into the wedge-shaped insertion openings 50 of the two centring pin receptacles 47 of the first centring device 36 of the docking receptacle 31. At the same time, the conical faces of the insertion sections 62 of the centring pins 61 of the second centring device 37 the docking receptacle 31 slide into the insertion recesses 83 of the centring pin receptacles 77 of the second centring device 78 of the docking slot.

Next, a further fine centring of the docking slot 32 in the docking receptacle 31 is done by a further movement of the docking slot 31 in the insertion direction 34. In this process, the two centring pins 71 of the first centring device 72 of the docking slot 32 slide with their cylindrical centring sections 73 into the cylindrical centring recesses 55 of the two centring pin receptacles 47 of the first centring device 36 of the docking receptacle 31.

Simultaneously, the cylindrical centring sections 63 of the centring pins 61 of the second centring device 37 of the docking receptacle 31 slide into the centring recesses 87 of the centring pin receptacles 77 of the second centring device 78 of the docking slot. The movement of the docking slot 32 in the insertion direction 34 towards the docking receptacle 31 is delimited by the first stop faces 51, 93 of the first stop devices 52, 94 of the first centring device 36, 72. Furthermore, the movement of the docking slot 32 in the insertion direction 34 towards the docking receptacle 31 is delimited by the second stop faces 64, 84 of the second stop devices 65, 85 of the first centring device 36, 72.

As soon as the stop faces 51, 93 of the first stop devices 52, 94 and the stop faces 64, 84 of the second stop device 65, 85 line up, the insertion of the docking slot 32 in the docking receptacle 31 is delimited in the axial direction. The docking slot 32 is now fully inserted into the docking receptacle 31.

Preferably electrical contacts (not shown) are provided both on the docking slot 32 as well as on the docking receptacle 31, which contact each other as soon as the docking process has finished. A signal generated in this way is used to move the actuating cylinder 95 of the hydraulically operable wedge forks 59 downwards in a vertical direction such that the prongs of the wedge forks 59 engage in the grooves 58 of the securing section 57 of the first centring pins 71 of the first centring device 72 of the docking slot and in addition to the arrestor hooks 44, prevent the uncoupling of the docking slot 32 from the docking receptacle 31.

To secure the wedge forks, a pneumatically operable locking device 91 is provided which inserts corresponding locking pins 96 through locking holes 97 formed in the securing section 57 and in the forks of the wedge fork 59 and in this manner fix and secure the position of the wedge forks 59.

Simultaneously, if necessary, PTO connecting devices and/or driveshaft connecting devices of the docking receptacle 31 and of the docking slot 32 are connected together in this final position.

REFERENCE LIST

30 Docking device
31 Docking receptacle

32 Docking slot
33 Pre-centring device
34 Insertion direction
35 Insertion lead-in
36 First centring device
37 Second centring device
38 Centring axes
39 First docking wall
40 Second docking wall
41 Inner side wall
42 Outer side wall
43 Receiving space
44 Arrestor hooks
45 Catch pin guide
46 Arrestor hook cylinder
47 Centring pin receptacle
48 Hole
49 Insertion/centring section
50 Cone-shaped insertion opening
51 First axial stop face
52 First stop device
53 Dirt removal grooves
54 Tubular centring section
55 Cylindrical centring recess
56 Hole
57 Securing section
58 Grooves
59 Wedge fork
60 Axial securing device
61 Centring pins
62 Insertion section
63 Centring section
64 Second stop face
65 Second stop device
66 Recess
67 Drive shaft connecting device
68 PTO connecting device
69 Capturing recesses
70 First docking wall
71 First centring pins
72 First centring device
73 Cylindrical centring section
74 Wedge fork receptacle groove
75 Insertion body
76 Second docking wall
77 Centring pin receptacle
78 Second centring device
79 Coupling plate receptacle
80 Hole
81 Securing section
82 Centring section
83 Insertion recess
84 Second stop face
85 Second stop device
86 Dirt removal groove
87 Centring recess
88 Capturing pin shaft
89 Capturing pin
90 Lower wall
91 Locking device
92 Wedge fork receiving groove
93 First stop face
94 First stop device
95 Actuating cylinder wedge fork
96 Locking pin
97 Locking hole
100 Coupling plate
101 Base plate
102 Electronic connecting device
103 Electrical connecting device
104 Electrical control contact
105 Centring device
106 Centring pin
107 Centring recess
108 Connecting hole
109 Plastic bushing
110 Recess
111 Fastener
112 Positioning device
113 Hydraulic connecting device
114 Pneumatic connecting device
115 Valve block

The invention claimed is:

1. A coupling plate of a docking device to form electrical, electronic, hydraulic and/or pneumatic connections, comprising:
an approximately flat base plate (101),
at least two hydraulic coupling devices (113) formed in the base plate (101),
at least one electronic connecting device (102) to provide an electronic connection between a control device of a vehicle and a control device of an accessory device,
at least one electrical connecting device (102),
a centring device (105) with at least two coupling and/or counter coupling elements (106, 107) for the relative alignment of the coupling devices of the coupling plate (100) and if necessary corresponding couplings,
wherein the coupling plate (100) is connected to a docking slot (32) or a docking receptacle (31) with the docking receptacle having a recess (66), and the coupling plate (100) the axial connection direction of the docking device (30) and is arranged to be positionally fixed relative to the docking slot or on the docking receptacle; and
wherein the at least two coupling and/or counter coupling elements (106, 107) in the base plate (101) are disposed within the recess (66) of the docking receptacle (31).

2. The coupling plate according to claim 1, further comprising connecting holes (108) provided on the coupling plate (100) to connect the coupling plate (100) with a coupling device, such as a docking slot (32) or a docking receptacle (31), wherein the connecting holes (108), tubular rubber or plastic bushings (109) are arranged which are formed out of an elastic material wherein, in corresponding recesses of the plastic bushings (109), fasteners (111) are arranged to attach the coupling plate (100) to a coupling device (31, 32).

3. The coupling plate according to claim 1, wherein the hydraulic connections (113) are provided to supply a hydraulic connection to supporting foot cylinders.

4. The coupling plate according to claim 1, wherein the electronic connection device (102) is designed to identify an accessory device.

5. The coupling plate according to claim 1, wherein the electrical connecting device (103) is provided to activate a light on an accessory device.

6. The coupling plate according to claim 1, wherein at least one electrical connection (104) is provided to detect, by means of a contact signal, whether two coupling devices are coupled together correctly to couple a vehicle and an accessory device.

7. The coupling plate according to claim 1, further comprising a pneumatic connecting device (114) is provided.

8. The coupling plate according to claim 1, further comprising a valve block (115) is flange-connected to the coupling plate (100) on the coupling plate on the vehicle and is connected solidly to the base plate (101).

9. The coupling plate according to claim 1, further comprising connecting holes (118) are provided on the coupling plate (100) to attach the coupling plate (100) to a docking slot (32) or to a docking receptacle (31) of a docking device, wherein tubular bushings (109) of an elastic material are arranged in the connecting holes (108) with a slight amount of clearance in the transverse direction to enable connecting bolts to pass through the connecting hole (108) or to ensure that there is dampening of a coupling movement in the axial direction.

10. A method of coupling two coupling plates designed according to according to claim 1, comprising the following steps:
insertion of a docking slot (32) in the insertion direction in a docking receptacle (31),
coupling the docking slot (32) with the docking receptacle (31),
wherein when connecting both coupling plates (100), the centring pins (106) of the coupling plate (100) connected to a docking receptacle (31) are inserted into the corresponding centring recesses (107) of the coupling plate (100) connected to the docking slot (32) and, in this manner, both coupling plates (100) are aligned with each other, in particular in a vertical connecting plane, and
wherein all electrical, electronic, hydraulic and/or pneumatic connections provided on docking slot (32) and docking receptacle (31) are connected together.

11. The coupling plate according to claim 1, wherein the two coupling elements (106, 107) are disposed on opposite sides of the coupling plate (100).

12. The coupling plate according to claim 11, wherein the two coupling elements (106, 107) are disposed equidistant from a connecting hole (108), the connecting hole (108) located at the center of the coupling plate (100).

13. The coupling plate according to claim 1, further comprising a compressible bushing (109) disposed in the connecting hole (108), the compressible bushing (109) deforming upon axial movement of the coupling plate (100).

14. The coupling plate according to claim 1, wherein the coupling plate (100) is automatically connected to the docking slot (32), without any external displacement mechanism.

15. The coupling plate according to claim 1, wherein the coupling elements (106, 107) are elongated pins having a closed distal end.

16. The coupling plate according to claim 11, wherein the two coupling elements (106, 107) are separate components spaced from the electrical, hydraulic and/or pneumatic connections.

17. The coupling plate according to claim 8, wherein the valve block (115) is disposed between the coupling plate (100) docking receptacle (31).

* * * * *